(12) United States Patent
Moran et al.

(10) Patent No.: US 12,143,302 B1
(45) Date of Patent: Nov. 12, 2024

(54) HIGHLY OPTIMIZED NETWORK-ON-CHIP DESIGN AT LARGE SCALE

(71) Applicant: XSIGHT LABS LTD., Kiryat Gat (IL)

(72) Inventors: Gil Moran, Kiryat Gat (IL); Guy Koren, Rishon Lezion (IL); Gal Malach, Gedera (IL)

(73) Assignee: XSIGHT LABS LTD., Kiryat Gat (IL)

( * ) Notice: Subject to any disclaimer, the term of this patent is extended or adjusted under 35 U.S.C. 154(b) by 614 days.

(21) Appl. No.: 17/444,473

(22) Filed: Aug. 4, 2021

Related U.S. Application Data

(60) Provisional application No. 63/198,170, filed on Oct. 1, 2020, provisional application No. 62/706,294, filed on Aug. 7, 2020.

(51) Int. Cl.
*H04L 47/125* (2022.01)
*G06F 15/78* (2006.01)
*H04L 47/10* (2022.01)
*H04L 47/70* (2022.01)

(52) U.S. Cl.
CPC ........ *H04L 47/125* (2013.01); *G06F 15/7825* (2013.01); *H04L 47/39* (2013.01); *H04L 47/822* (2013.01)

(58) Field of Classification Search
CPC ..... H04L 47/125; H04L 47/39; H04L 47/822; G06F 15/7825
USPC ......................................................... 370/252
See application file for complete search history.

(56) References Cited

U.S. PATENT DOCUMENTS

| | | | |
|---|---|---|---|
| 8,155,113 B1 | 4/2012 | Agarwal | |
| 10,511,523 B1 | 12/2019 | Bosshart et al. | |
| 10,721,167 B1 | 7/2020 | Bosshart et al. | |
| 11,424,983 B2 | 8/2022 | Chang | |
| 2010/0191911 A1 | 7/2010 | Heddes et al. | |
| 2011/0087820 A1* | 4/2011 | Norden | G06F 13/4059 710/310 |
| 2013/0051385 A1* | 2/2013 | Jayasimha | H04L 45/00 370/389 |
| 2013/0250792 A1* | 9/2013 | Yoshida | H04L 49/9047 370/252 |
| 2014/0019512 A1* | 1/2014 | Ajima | H04L 49/25 709/201 |
| 2014/0376557 A1* | 12/2014 | Park | G06F 15/17381 370/400 |
| 2015/0254104 A1* | 9/2015 | Kessler | G06F 9/5016 711/170 |

(Continued)

*Primary Examiner* — Anh Ngoc M Nguyen
*Assistant Examiner* — Syed M Bokhari
(74) *Attorney, Agent, or Firm* — Reches Patents

(57) ABSTRACT

There may be provided a method for traffic control in a network on chip (NOC), the method may include receiving, by input interface units of the NOC, flow control units destined to output interface units of the NOC; wherein multiple routing paths span between the input interface units and the output interface units; wherein at least some of the routing paths are formed by multiple routers of a grid of routers of the NOC and have a single turning point; allocating virtual channels to the flow control units, wherein an allocating of a virtual channel to a flow control unit (FCU) is based on a type of a transaction associated with the FCU and on a location of the single turning point; and routing the flow control units, based on the virtual channels allocated to the FCUs, between the input interface units and the output interface units.

8 Claims, 7 Drawing Sheets

(56) References Cited

U.S. PATENT DOCUMENTS

| | | | |
|---|---|---|---|
| 2016/0149780 A1* | 5/2016 | Hsu | G06F 30/398 370/252 |
| 2019/0238665 A1 | 8/2019 | Bosshart et al. | |
| 2021/0152469 A1* | 5/2021 | Bharadwaj | H04L 49/253 |
| 2021/0194800 A1 | 6/2021 | Bosshart | |
| 2022/0091754 A1 | 3/2022 | Raman et al. | |

* cited by examiner

PRIOR ART

PRIOR ART

HIGHLY OPTIMIZED NETWORK-ON-CHIP DESIGN AT LARGE SCALE

BACKGROUND

NoC (Network on a Chip) based architecture is highly scalable interconnect as opposed to traditional bus systems and point to point approaches.

A NoC is a packet/flit-based communication network that have been proposed as an alternative solution to standard bus-based interconnects in order to address the global communication demands of future chip-multiprocessors (CMP) and system-on-chip (SoC).

A generic NoC includes of several PEs (Processing Engines) 11 arranged in a mesh-like grid, as shown in a 4×4 NoC 10 as shown in FIG. 1. The PEs may be of the same type or of different types. Each PE is connected to a local router (router 12) and each router is, in turn, connected via physical channels 13 to adjacent routers forming a packet based on-chip network. The router sends packets from a source to a destination through several intermediate nodes. PEs communicate with each other by injecting data packets into the network. The packets traverse the network toward their destination, based on various routing algorithms and control flow mechanisms.

One of the major challenges when designing a large scale NoC is congestion handling. Congestion in one node of the network tends to spread to adjacent nodes very fast leading to a major reduction in the overall system performance. This effect is particularly strong in networks where a single buffer is associated with each input channel, which simplifies router design, save area and power, but prevents sharing a physical channel at any given instant of time. FIG. 2 shows a head of line blocking demonstrated on simplified router 20 with a single input buffer 22 per channel 22. The local buffers are followed by a crossbar 24 controlled by an arbiter- and has multiple output channels 25. In FIG. 2 the local port was omitted for simplicity of explanation) where each input channel has a single buffer that store incoming flow control units (flits) such as packets. In FIG. 2 each flit has a different marking which represent the desired target output. An arbitrary arbitration scheme was used to demonstrate the lower utilization occurs due to head-of-the-line (HOL) blockage.

A well-known approach to address low channel utilization, caused by head-of-the-line blocking, is virtual channels (VCs) based router. In VCs based router design each input channel has multiple buffers-one per each output direction. When flit arrives to the input channel, it pushed to the right buffer according to its target output. The use of VCs eliminate blocking and allows full throughput per direction. However, for large scale networks and large flit sizes e.g. 32B, 64B the area overhead and the corresponding power consumption may be significant and, in some cases, not feasible. FIG. 3 shows general structure of VCs based router including input channels 31, input buffers 32, crossbar 33 controlled by an arbiter 34 and having output channels 35.

The limited scalability of a system bus limited number of functional units that can be supported.

SUMMARY

There may be provided systems, methods, and computer readable medium as illustrated in the specification.

BRIEF DESCRIPTION OF THE DRAWINGS

The embodiments of the disclosure will be understood and appreciated more fully from the following detailed description, taken in conjunction with the drawings in which.

DETAILED DESCRIPTION OF THE DRAWINGS

Figure 1:
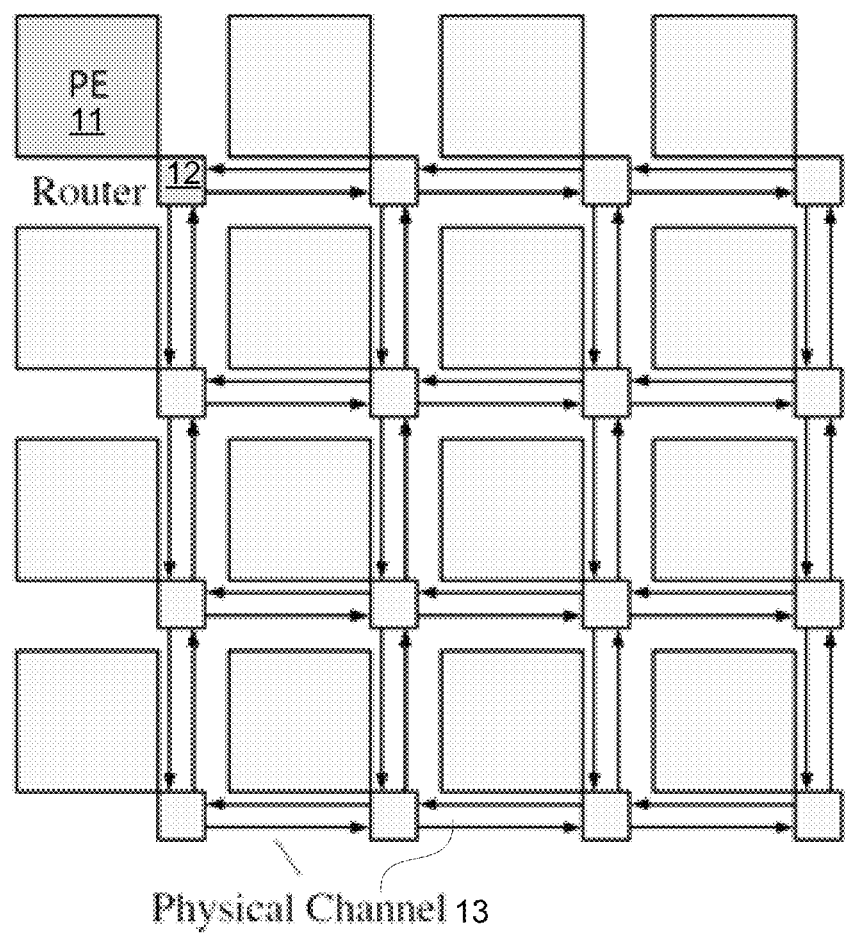
FIG. 1 illustrates an example of a prior art NOC.
Figure 2:
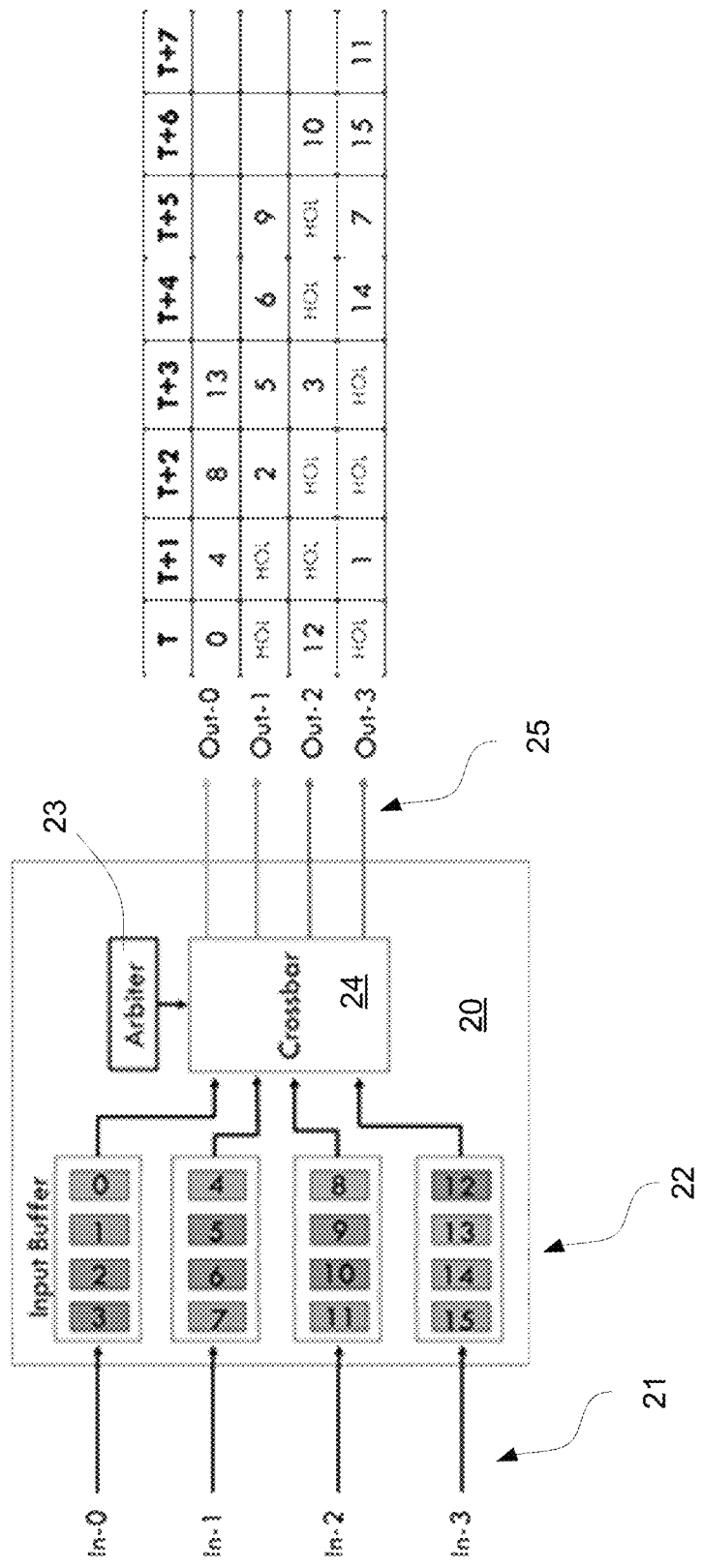
FIGS. 2-3 illustrate blocking problems.
Figure 3:
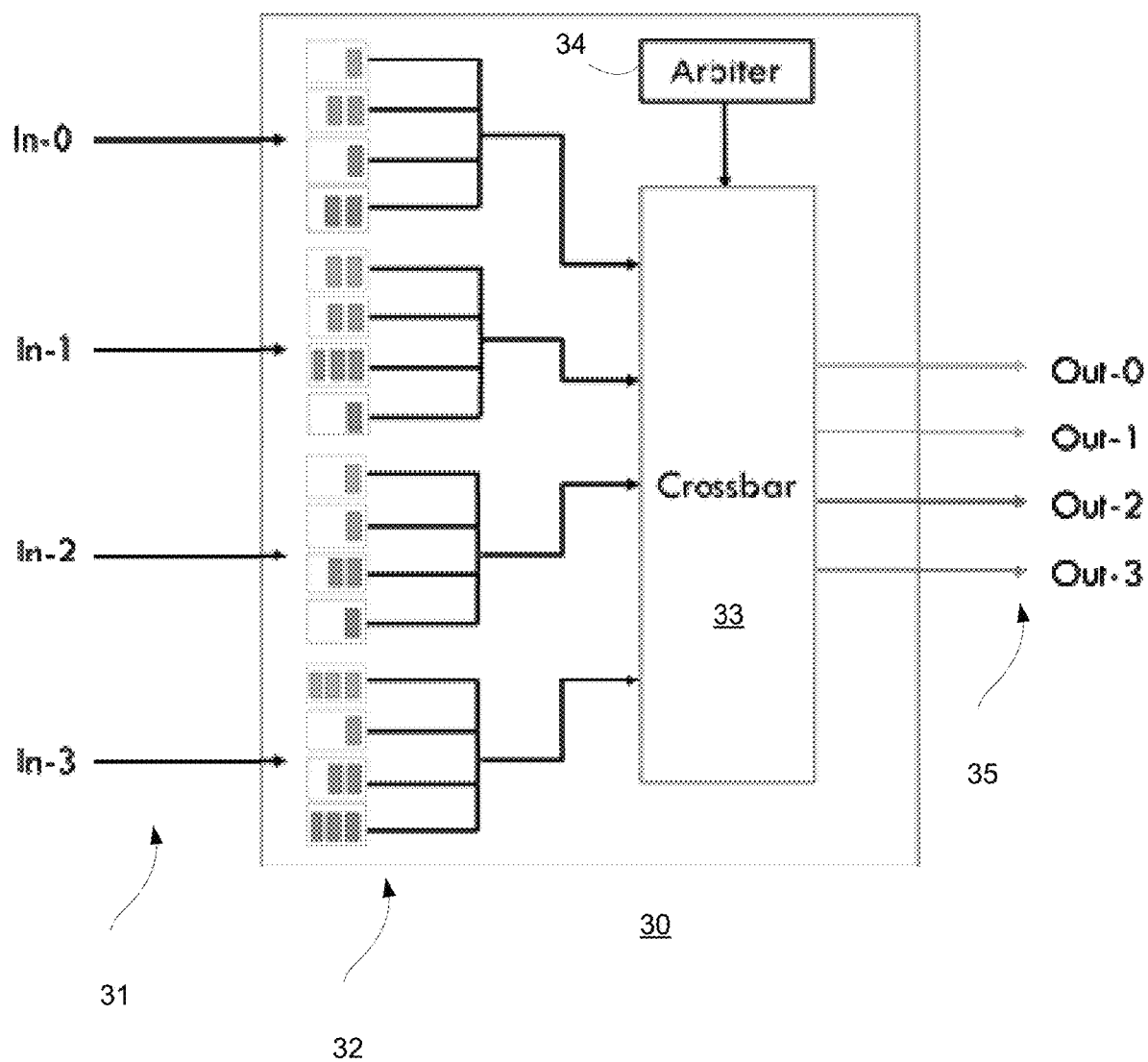

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions. The non-transitory computer readable medium may be executed, for example, by one or more routers of the NOC.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The terms packet and flit are used in an interchangeable manner.

In addition to the challenge of creating non-blocking service for multiple flows sharing the same physical cannels while using minimal number of stage buffers, there are other requirements need to be met in order to have a sustainable solution:
- Maintaining high efficiency on very large mesh array (simple implementations in such networks with uniform traffic saturate at ~6% injection rate).
- Supporting multiple flows with oversubscription (for example, read/write vs. packet processing, Rx vs. Tx). Allocating router buffers to winning flows reserves some of the storage resources for other flows to provide stable system behavior.
- Minimizing per node hop routing latency at high frequency while supporting multiple virtual channels.
- Cost efficiency of the routers while covering full round-trip delay from router to router using over-subscription on the bandwidth.
- Apply dynamic load balancing
- Considering route point to point order in the load balancing decisions
- Large data flits (16B-64B)

Optimized NoC Design

Figure 4:
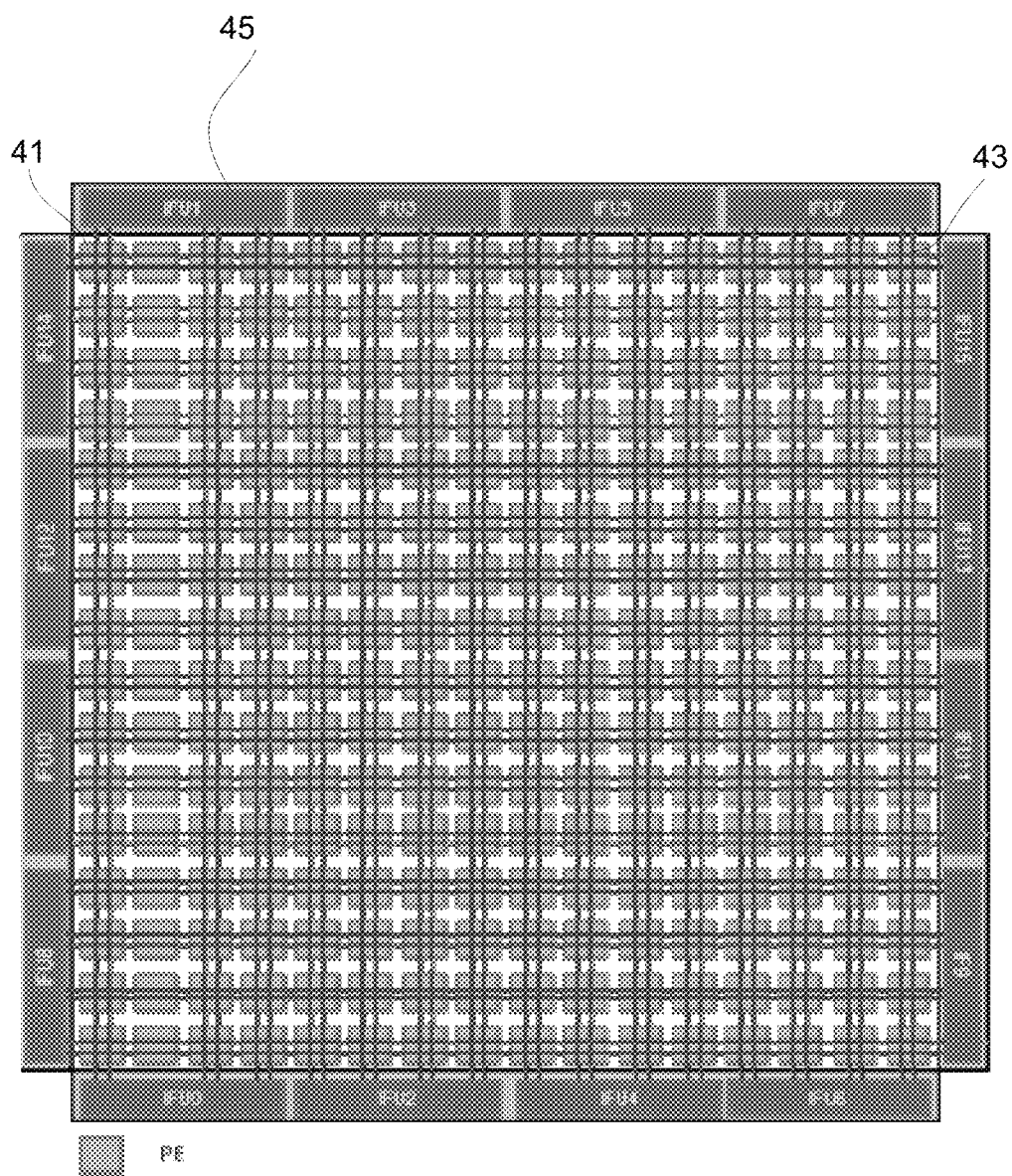
FIG. 4 illustrates an example of a NOC.

FIG. 4 shows a 16×16 network on a chip 40 that includes large mesh array of 16×16 routers 42 and associated Processing Engines (PEs) (not shown) and side connection to Interface Units (IFUs) 54—whereas each IFU may cat as an input interface unit and/or an output interface unit. The number of PEs and routers may differ from 16×16.

The NoC is used for all point to point messages delivered by all system clients. The data channels include 256b of data payload and 32b of attributes and common fields. Each primary network includes duplicated physical channels to account for high throughput requirements and load balancing can be done at three different levels:
- Physical channel selection.
- Dynamic routing path selection e.g. XY or YX.
- Virtual channel and sub-channel selection.

As described earlier, one of the main challenges in large mesh implementation is cost, which has two components:
- Number of wires (or number of physical channels).
- Depth (area) of the of staging buffers in each mesh router.

Given variety of workloads and the area limitation per PE node (256 nodes), improvements in routing efficiency for large scale mesh are needed to get more bandwidth from less wires, sharing the physical channels by multiple flows. These optimizations are needed to efficiently utilize the physical channels with changing flow conditions, without increasing too much the cost of complicated virtual channel router Partially Adaptive Routing Our NoC implementation allows adaptive routing with the following degrees of freedom:

Supporting either XY or YX routing scheme (method can be extended for any congestion driven dynamic routing). Once the scheme is selected, routing starts in the first selected dimension until completion, then turns to the second dimension and runs until the target. If no turn is needed route starts from the second dimension.

Supporting dynamically load-balanced physical channel selection. This is mainly done at the network entry points (based on congestion measurements) and network exit points (towards multiple targets) but could also be done along the routing paths.

To allow deadlock-free mixture on XY and YX routing two virtual channels are defined:
- BT—Before Turn
- AT—After Turn By allowing flits with AT virtual channel to bypass flits with BT virtual channel in any arbitration point, mesh routing becomes deadlock free. Flits with BT virtual channel can be queued behind flits with AT virtual channel without creating deadlock.

In our experiments the partially adaptive routing defined here increased injection rates (flits per node per cycle) by about 25% on a large 16×16 mesh, compared to standard Dimension Ordered Routing (DOR).

Separating Virtual Networks for the Protocol (e.g. Requests and Responses)

To further increase the usage of physical channels, two transaction level flows also share the same physical channels. For example, Requests and Responses may share the same physical channels. This is done by another split in the virtual channels to RQ (VN1) and RS (VN0). By allowing VN0 response flits to bypass flits with VN1 request flits in any arbitration point, protocol level deadlock is avoided. VN1 flits can be queued behind VN0 flits without creating deadlock (in different implementations the router may reserve place for VN1 flits and allow them to bypass VN0 flits for performance improvement, though it is not required for deadlock freedom).

Combined with partially adaptive routing we use four VCs:
- 00: VN0AT-response after turn
- 01: VN0BT-response before turn
- 10: VN1AT-request after turn
- 11: VN1BT-request before turn.

A classical multi-VC router splits the input buffer in each router and holds enough storage elements per VC to cover the round-trip delay for the case that all flits use the same VC. Typically, the output arbiter in one router holds credits to manage the input buffer storage in the next hop router (per direction). One storage credit is consumed for the used VC when a flit is launched to the next router hop and returned when the next router input buffer signals the removal of the flit from its VC storage buffer.

A fast router with one clock hop latency and sampled credit return has round trip delay of three clock cycles and needs three credits per VC to achieve full utilization. When route distance increases, and the router needs additional sampling stage for data in one direction and for credit in the other direction, the round-trip delay grows to five clock cycles or more.

A classical router with input buffer per direction incoming direction reserves buffers to cover the round-trip delay for each VC, in this example: 4 VCs×5 Clocks=20 stages.

In this example, our solution of hierarchical VC credit management achieves similar performance goals for the same latency conditions using only eight stages.

Separating Flows Using Shared Physical Channels

In addition to VCs for deadlock-free adaptive routing and VCs deadlock-free protocol dependencies, the interconnect is also required to serve high level flows over the same physical network, and prevent the cases where severe backpressure on one high level flow causes severe backpressure on the other. In our case we distinguished packet flow (writing and reading packet data facing the network side) from processing flow (processing packets that are already stored in memory).

A classical router would double the virtual channels for this purpose where each VC holds credit to cover round-trip delay. In the example above it requires 40 stages in each router input FIFO (per side). In the oversubscribed proposal in this patent we can still use eight stages to achieve similar performance goals with same latency conditions, though increasing that number a bit helps.

Proposed Oversubscribed Virtual Networks on Shared Physical Channels

Figure 5:
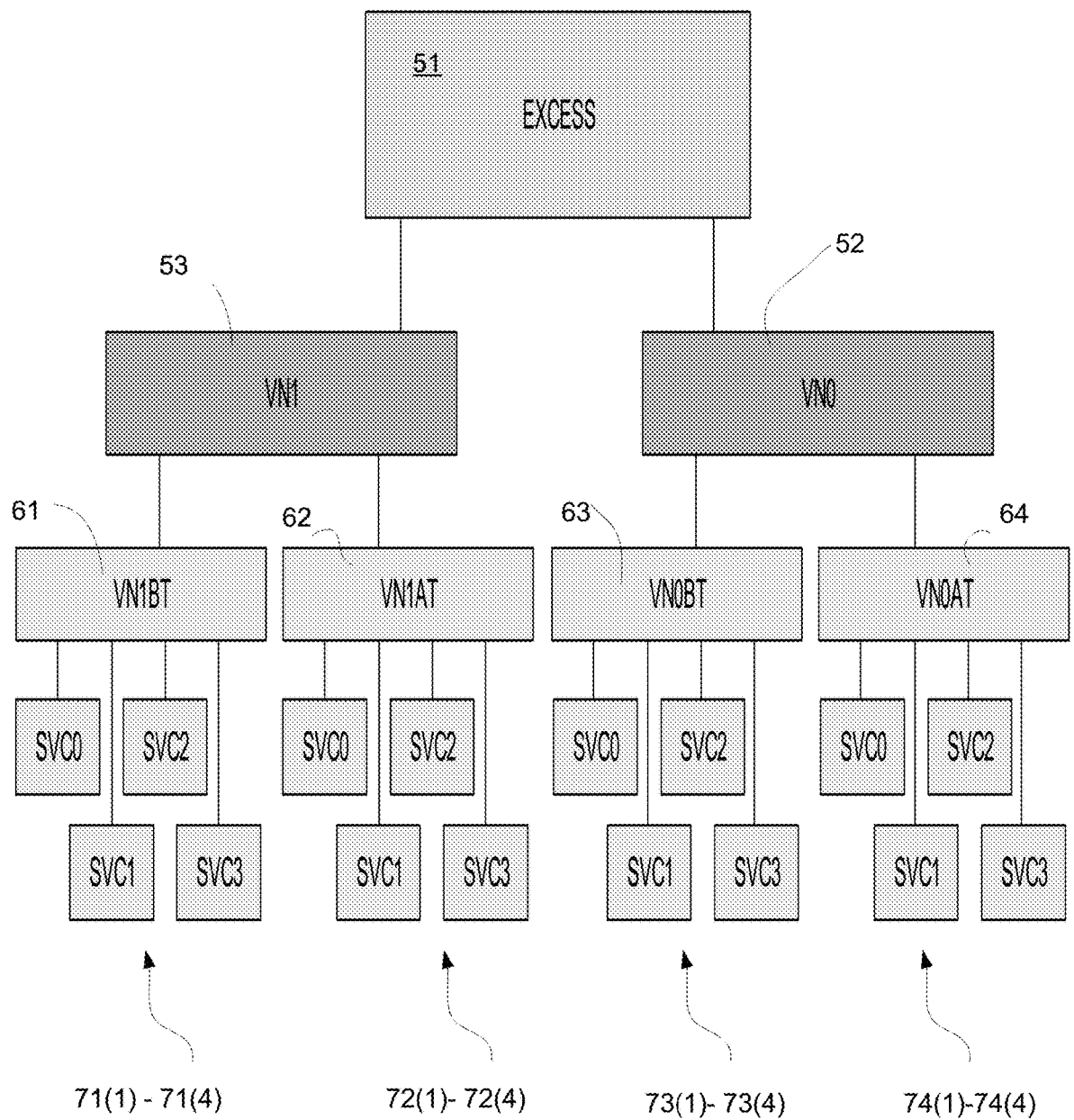
FIG. 5 illustrates an example of various virtual channels and sub virtual channels.

This patent proposes cost-efficient router implementation with virtual FIFO at the input stage of mesh routers. It uses hierarchical credit management scheme as shown in FIG. 5. The base VC hierarchy level holds credit counters 61, 62, 63 and 64 per Virtual Channel (VN1BT, VN1AT, VN0BT, VN0AT), the middle hierarchy level holds credit counters 52 and 53 per Virtual Network (VN1 or VN0), and the top hierarchy level hold EXCESS credit counter 51. Additionally, each VC has few sub-level VCs (SVCs), which enable oversubscribed usage of the shared resources by multiple flows (such as packet and processing) with minimal blocking and without duplicating the storage resources. Thus there are sixteen sub-VC counters 71(1)-71(4), 72(1)-72(4), 73(1)-73(4), and 74(1)-74(4).

In the proposed implementation credit are implemented by signed counters initialized to the available base credit. A counter reached negative consumption is tracking per VC and per VN the number of credits borrowed from the next levels. The EXCESS counter never becomes negative as it is the last level. Using signed number representation also improves the credit management implementation timing, by using sign bit and zero bit to indicate VC/VN status rather than comparing numbers. It enables implementation of high-frequency router with low hop latency from input to output.

The SVC credits within each VC are used, per flow, to limit the number of credits requested by that flow. SVC credit counters are unsigned and allow their ordering domain to progress when they are non-zero. In our implementation we use four SVCs per VC, mapping SVC0/1 to be used by packet flow and SVC2/3 to be used by processing flow. Within each adjacent pair of odd/even SVCs load balancing is implemented by interleaving odd and even route turn points or odd/even target end points and allowing bypassing in case of backpressure. This mapping statistically reduces blockages by 50% along nodes on the path to the target. Usage of more SVCs per VC (combined with larger number of EXCESS credits) can further reduce blockages (for example interleaving four SVCs at their turn points removes 75% of the blockages).

Principle of Operation

Figure 6:
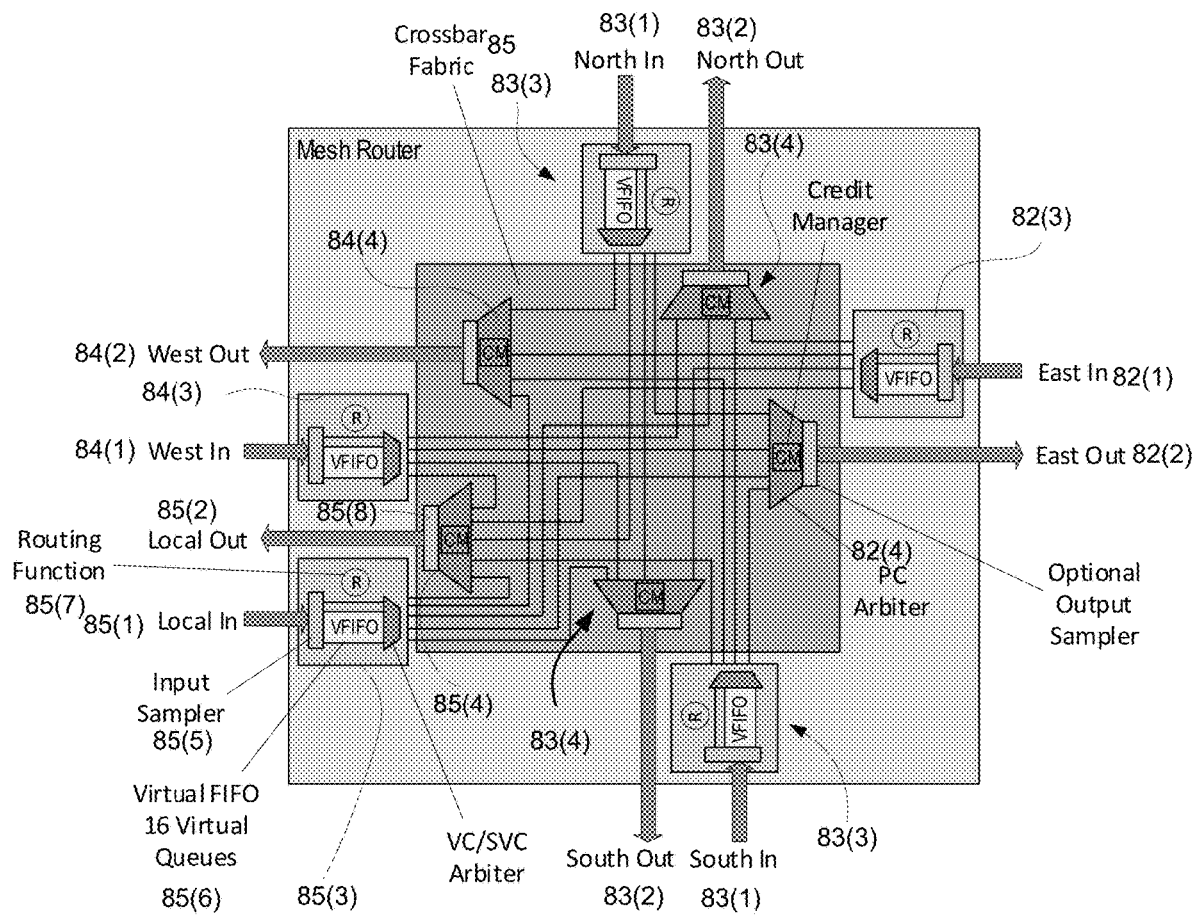
FIG. 6 illustrates an example of a router of the NOC of FIG. 4.

FIG. 6 illustrates the block diagram of an example of a router. The router has bidirectional connection in four directions (cast, local, south and north) and a local port (for communicating with a PE associated with the router.

The figure illustrates cross bar fabric 85, north in port 81(1), north out port 81(2), north storage and routing unit 81(3), north credit manager 81(4), cast in port 82(1), cast out port 82(2), cast storage and routing unit 82(3), east credit manager 82(4), south in port 83(1), south out port 83(2), south storage and routing unit 83(3), south credit manager 83(4), local in port 85(1), local out port 85(2), local storage and routing unit 85(3), and local credit manager 85(4).

Each storage and routing unit may include a virtual FIFO (for example local virtual FIFO 85(6)) and a routing function 85(7). Each storage and routing unit may also include one or more samples such as input sampler (for example local input sampler 85(5)) and output sampler (for example local output sampler 85(8)).

The input stage from each direction includes an input sampler and a virtual FIFO with eight stages and sixteen virtual queues (the multiplication of four VCs by four SVCs). The input sampler is used for timing and bypasses the virtual FIFO in the case that the route direction is straight and there are no flits waiting to be routed in straight direction with the same SVC of the sampled flit. The sampler improves timing and reduces latency for straight route, while paths sampled in the virtual FIFO add another clock of latency. Each output port may also hold an output sampler per direction used for high frequency implementation, which may be omitted on a lower frequency implementation or when the distance to the next router is short.

The routing function selects the direction of the packet and condition the request per direction by bitwise indications from the direction credit manager that the SVC can progress. VC/SVC arbiter in the local port chooses a candidate requester for the selected direction from either the sampler of one of the virtual FIFO queues.

The crossbar fabric holds arbiters per output physical channel, and each arbiter holds a hierarchical credit manager tracking the VC/SVC usage of the next hop router input stage.

A packet is routed in the first dimension using an appropriate before-turn VC (VN0BT or VN1BT), then turns to the second dimension using the matching after-turn VC (VN0AT or VN1AT). The flow of the packet is held constant along the routing path in MS bit SVC [1], and load balancing of the packet is managed along the routing path by LS bit SVC [0]. On the first dimension the packet sets SVC [0] according to odd/even position of the turn node point in that dimension. When turning to the second dimension the packet updates SVC [0] according to odd/even position of the target mesh node on that dimension. If after turn the packet is destined to exit the mesh, the selection of SVC [0] is either based on the odd/even position of the turn node to that dimension or randomized in the case that adaptive routing is allowed.

The usage of SVC [0] in the example above does not change per SVC point to point ordering for the cases that required it, because the load balancing is a function of the pre-determined routing path. It allows packets from different SVCs to bypass each other and removes 50% of the blockages without giving up route determinism. Simulation show improvement of mesh efficiency (flits per node per cycle) of about 50% for uniform traffic patterns.

Credit Computation in the Credit Manager

A packet belongs to one of multiple ordering domains determined by the duplication of the number of VCs by the number of SVCs per VC. In our example we have four VCs and four SVCs per VC, or sixteen ordering domains.

The credit manager marks bitwise for the output port it manages, the availability of at least one credit per each ordering domain. Only packet from ordering domain with non-zero SVC counter and with capability to consume from either its VC counter, its next level VN counter, or the last level EXCESS counter can progress. Positive non-zero VC counter or VC counter can provide credits without going to the next level, and non-zero EXCESS counter (which is always positive) allows consuming from the shared pool. In order to successfully consume credit, SVC must be non-zero (always positive) and at least one of the hierarchies available to the VC must have positive non-zero credit counter, otherwise the ordering domain is blocked.

The VC consumption is done hierarchically as follows: If the VC credit counter is zero or negative, look at the associated VN counter. If both VC and associated VN counters are zero or negative and EXCESS counter is non-zero consume from EXCESS. The first non-zero positive counter found in hierarchy level is terminating the hierarchical consumption, and all counters from the leaf counter up to and including the contributing hierarchy level counter are decremented. Also, the appropriate SVC counter is decremented.

The return of credits is done in reverse order: The SVC counter is incremented, and all negative counters in the path starting from the leaf VC counter to the EXCESS counter are incremented. The increment signal is propagated by through each negative counter in the hierarchy to the next hierarchy level counter and increments that counter as well. The hierarchical propagation stops at the first non-negative counter.

For example, consider an implementation with RSAT=1, RSVN=1, EXCESS=2, SVC=3, where three credits are consumed by RSAT channel SVC0, and later all three credits are returned:

First consumption changes SVC0 to 2, RSAT to 0, keeps RSVN=1, and keeps EXCESS=2

Second consumption changes SVC0 to 1, RSAT to −1, RSVN to 0, and keeps EXCESS=2

Third consumption changes SVC0 to 0, RSAT to −2, RSVN to −1, and EXCESS to 1.

SVC0 is now blocked, but other SVCs from this RSAT (e.g. SVC1) can consume from EXCESS and make forward progress.

On first release both RSAT and RSVN are negative, so they are incremented and propagate increment signal and EXCESS that is incremented as well, resulting in: SVC0=1, RSAT=−1, RSVN=0, EXCESS=2

On second release negative RSAT is incremented and propagates the increment signal to RSVN which is also incremented. Because RSVN is not originally negative, the propagation stops, and EXCESS counter is unchanged. The result is SVC0=2, RSAT=0, RSVN=1, and EXCESS=2.

On third release there is no negative counter on the path, so only SVC0 and RSAT are incremented. The result is SVC0=3, RSAT=1, RSVN=1, and EXCESS=2.

Minimal Number of Stages for Deadlock Freedom

The minimal deadlock free counter combination with using the proposed hierarchical scheme with non-zero EXCESS is allocating the following numbers of credits:

VN1AT=VN1AT=1
VN1BT=VN0BT=0
VN1=0
VN0=1
EXCESS=1

Without EXCESS counter (EXCESS=0) for deadlock freedom requires VN1VN=1.

In this combination VN1BT virtual channel can only consume from EXCESS. Therefore, four entries achieve deadlock-free routing while increasing the covered round-trip up to three clock cycles, compared to paying all credits at the leaves (VN1AT=VN1BT=VN0BT=VN0AT=1) with round-trip coverage of one cycle per VC.

High bandwidth implementation with 5-clock hop latency can use eight stages:

VN1AT=VN0AT=1
VN1BT=VN0BT=0
VN1=1
VN0=1
EXCESS=4

In this implementation after turn messages cover round-trip delay up to 6 clocks and before turn messages cover round-trip delay up to 5 clocks. Also, in this case VN1 (requests) can progress using the assured VN1 credit even in the case that all credits are consumed VN0 (responses).

Figure 7:
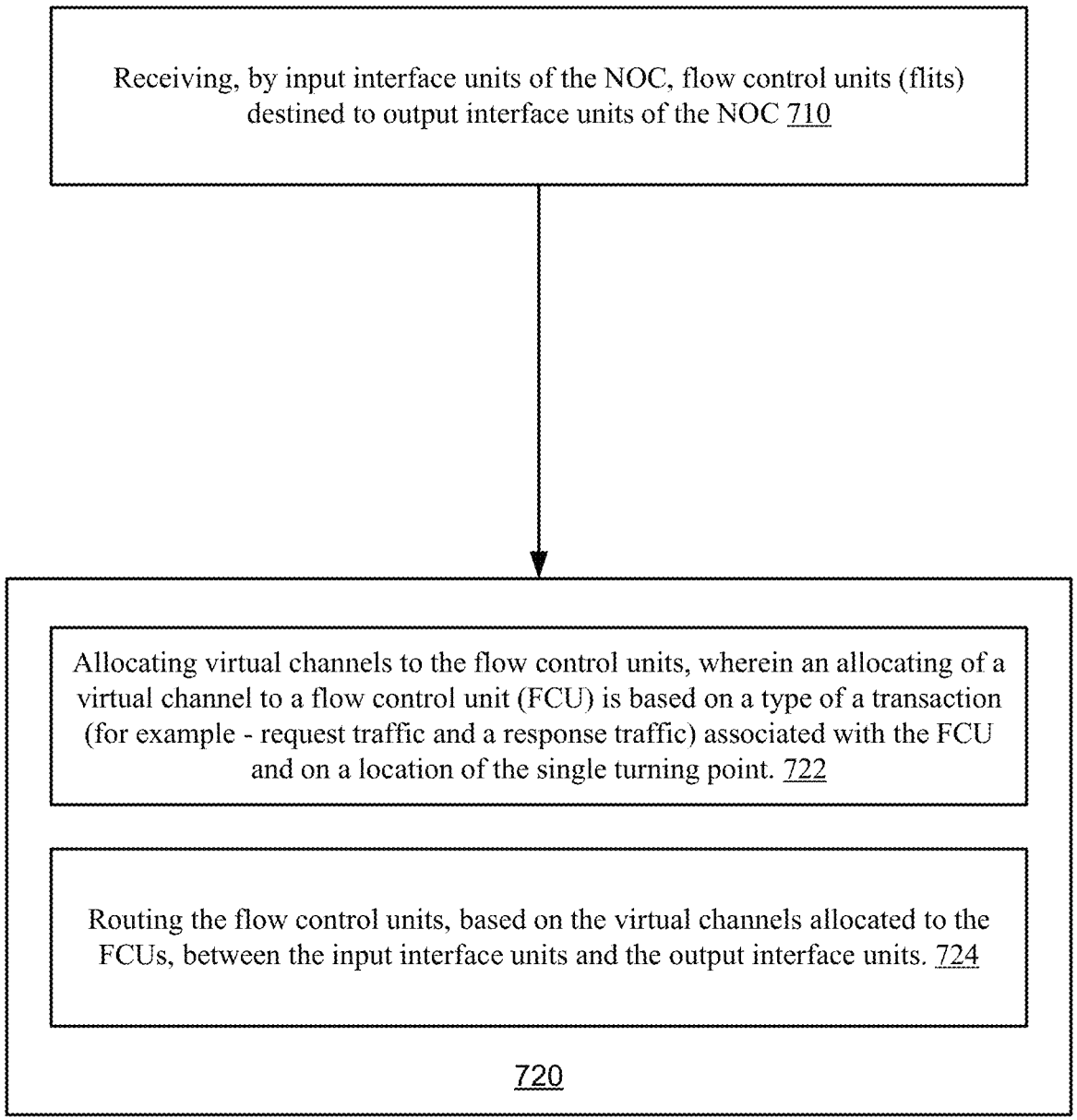
FIG. 7 illustrates an example of a method.

FIG. 7 illustrates method 700 for traffic control in a network on chip (NOC).

Method 700 may start by step 710 of receiving, by input interface units of the NOC, flow control units (flits) destined to output interface units of the NOC.

An input interface unit may also be an output interface unit.

Step 710 may include receiving the flits concurrently or not, the input interface units may be two or more of the input interface units of the NOC. The same applies on the output interface units.

Multiple routing paths span between the input interface units and the output interface units. There may be one or more routing path between a certain input interface unit and a certain output interface unit.

For simplicity of explanation it is assumed that there is a single routing path between a certain input interface unit and a certain output interface unit.

An input interface unit and an output interface unit may be in communication with entities outside the NOC.

A routing path may be from an input interface unit to itself.

A routing path may be without a turning point. A turning point represents a change in a direction (or dimension) of propagation—for vertical to horizontal, from horizontal to vertical- or any other direction change.

At least some of the routing paths are formed by multiple routers of a grid of routers of the NOC and have a single turning point. For simplicity of explanation it is assumed that all routing paths have a single turning point.

Step 710 may be followed by step 720.

Step 720 may include step 722 of allocating virtual channels to the flow control units, wherein an allocating of a virtual channel to a flow control unit (FCU) is based on a type of a transaction (for example—request traffic and a response traffic) associated with the FCU and on a location of the single turning point.

Step 720 may include step 724 of routing the flow control units, based on the virtual channels allocated to the FCUs, between the input interface units and the output interface units.

Step 722 may be followed by step 724.

It should be noted that multiple iterations of steps 724 and 744 may occur along a propagation of a flit routing path.

Step 720 may include maintaining, in routers of grid, a minimal allocation of flow control credit per each virtual route (VC). Thus—a router may utilize access resources— and allow overprovisioning-without allocating to one VC the minimal resource allocated to another VC.

Step 720 may include changing the allocating of a VC associated with an FCU that is routed along a routing path when reaching a single turning point of the routing path.

The VCs may include a first VC associated with request traffic and routers that precede the single turning point, a second VC associated with request traffic and routers that follow the single turning point, a third VC associated with response traffic and routers that precede the single turning point, and a fourth VC associated with response traffic and routers that follow the single turning point.

Step 720 may include allocating a sub VC out of multiple sub VCs per each VC, and wherein the routing is also based on the sub VCs.

The sub VCs may include a first sub VC allocated to an FCU flow and a second sub VC channel allocated to a processing flow.

The sub VCs may include a third sub VC allocated to routers of a routing path that precede the single turning point of the routing path, and a fourth sub VC allocated to routers of the routing path that follow the single turning point of the routing path.

The sub VCs may include a first sub VC allocated to an FCU flow, a second sub VC channel allocated to a processing flow, a third sub VC allocated to routers of a routing path that precede the single turning point of the routing path, and a fourth sub VC allocated to routers of the routing path that follow the single turning point of the path.

The routing may include performing load balancing between different sub VCs.

The for each of the at least some of the routing paths, the allocating and routing are executed by routers of the routing path, wherein the routers comprise at least one preceding router that precedes the single turning point of the routing path, a turning point router and at least one following router that follows the turning point router.

The method may include changing, by the turning point router, a preceding routing path allocated to a FCU to a following virtual channel.

The method may include allocating, by each of the routers of the routing path, (a) an VC queue per each VC, and (b) a sub VC for one or more sub VC associated with the VC.

The method may include exchanging, between a pair of adjacent routers of the routing path, information regarding an availability, per VC and sub VC, of a downstream router of the pair to receive one or more FCUs from an upstream router of the pair.

The method may include sending from a downstream router of a pair of adjacent routers of the routing path, information regarding an availability the downstream router of the pair to receive one or more FCUs from an upstream router of the pair.

a. The information may be a bitmap.
   b. The information may include an availability per VC.
   c. The information may include an availability per sub VC.
   d. The information may include an availability per VC, and per sub VC.

The downstream router may include a request traffic credit counter per request traffic, a response traffic credit counter per response traffic, and an excess counter.

Each VC credit counter is a signed counter and each sub VC credit counter is unsigned.

The method may include checking an availability of each VC credit counter by checking a single bit of a value of each VC credit counter.

The method may include checking an availability of each sub VC credit counter by checking a single bit of a value of each sub VC credit counter.

The method may include checking an availability of each VC credit counter by checking a single bit of a value of each VC credit counter.

Each router of the routing path may include samplers.

The routing may include selecting between two or more physical channels that couple one router of the grid to another.

There may be provided a network on chip (NOC) having routing capabilities, the NOC may include output interface units, a grid of routers, and input interface units configured to receive flow control units destined to the output interface units of the NOC. The NOC may also include a grid of processing elements, each associated with a router. Multiple routing paths span between the input interface units and the output interface units. At least some of the routing paths may be formed by multiple routers of the grid of routers and have a single turning point. For each routing path, multiple routers that form the routing path may be configured to: (a) allocate virtual channels to the flow control units destined to propagate over the routing path, wherein an allocation of a virtual channel to a flow control unit (FCU) may be based on a type of a transaction associated with the FCU and on a location of the single turning point; and route the FCUs, based on the virtual channels allocated to the FCUs, over the routing path.

For each routing path, multiple routers that form the routing path may be configured to maintain a minimal allocation of flow control credit per each virtual route (VC).

For each routing path, the multiple routers that form the routing path may be configured to allocate flow control credit above the minimal allocation of flow control credit, to at least one of the VCs.

The type of transaction may be selected out of a request traffic and a response traffic.

For each routing path, one of the multiple routers that form the routing path may be configured to change the allocating of a VC associated with an FCU that may be routed along the routing path when reaching a single turning point of the routing path.

The VCs may include a first VC associated with request traffic and routers that precede the single turning point, a second VC associated with request traffic and routers that follow the single turning point, a third VC associated with response traffic and routers that precede the single turning point, and a fourth VC associated with response traffic and routers that follow the single turning point.

For each routing path, multiple routers that form the routing path may be configured to allocate a sub VC out of multiple sub VCs per each VC, and wherein the routing may be also based on the sub VCs.

The sub VCs may include a first sub VC allocated to an FCU flow and a second sub VC channel allocated to a processing flow.

The sub VCs may include a third sub VC allocated to routers of a routing path that precede the single turning point of the routing path, and a fourth sub VC allocated to routers of the routing path that follow the single turning point of the routing path.

The sub VCs may include a first sub VC allocated to an FCU flow, a second sub VC channel allocated to a processing flow, a third sub VC allocated to routers of a routing path that precede the single turning point of the routing path, and a fourth sub VC allocated to routers of the routing path that follow the single turning point of the path.

For each routing path, multiple routers that form the routing path may be configured to perform load balancing between different sub VCs.

For each routing path, multiple routers that form the routing path may include at least one preceding router that precedes the single turning point of the routing path, a turning point router and at least one following router that follows the turning point router.

The turning point router may be configured to change a preceding routing path allocated to a FCU to a following virtual channel.

For each routing path, the multiple routers that form the routing path may be configured to allocate, by each of the routers of the routing path, (a) an VC queue per each VC, and (b) a sub VC for one or more sub VC associated with the VC.

The NOC wherein a pair of adjacent routers of each of the routing paths, may be configured to exchange information regarding an availability, per VC and sub VC, of a downstream router of the pair to receive one or more FCUs from an upstream router of the pair.

For each routing path, a downstream router of a pair of adjacent routers of the routing path may be configured to send information regarding an availability the downstream router of the pair to receive one or more FCUs from an upstream router of the pair.

a. The information may be a bitmap.
b. The information may include an availability per VC.
c. The information may include an availability per sub VC.
d. The information may include an availability per VC, and per sub VC.

The downstream router may include a request traffic credit counter per request traffic, a response traffic credit counter per response traffic, and an excess counter.

The each VC credit counter may be a signed counter and each sub VC credit counter may be unsigned.

The downstream router may be configured to check an availability of each VC credit counter by checking a single bit of a value of each VC credit counter.

The downstream router may be configured to check an availability of each sub VC credit counter by checking a single bit of a value of each sub VC credit counter.

The downstream router may be configured to check an availability of each VC credit counter by checking a single bit of a value of each VC credit counter.

Each router of the routing path may include samplers.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for traffic control in a network on chip (NOC), the method comprises: receiving, by input interface units of the NOC, flow control units destined to output interface units of the NOC; wherein multiple routing paths span between the input interface units and the output interface units; wherein at least some of the routing paths are formed by multiple routers of a grid of routers of the NOC and have a single turning point; allocating virtual channels to the flow control units, wherein an allocating of a virtual channel (VC) to a flow control unit (FCU) is based on a type of a transaction associated with the FCU and on a location of the single turning point; and routing the flow control units, based on the virtual channels allocated to the FCUs, between the input interface units and the output interface units; wherein the VCs comprise a first VC associated with request traffic and routers that precede the single turning point, a second VC associated with request traffic and routers that follow the single turning point, a third VC associated with response traffic and routers that precede the single turning point, and a fourth VC associated with response traffic and routers that follow the single turning point.

2. The method according to claim 1 comprising maintaining, in routers of grid, a minimal allocation of flow control credit per each VC.

3. The method according to claim 2 comprising allocating flow control credit above the minimal allocation of flow control credit, to at least one of the VCs.

4. The method according to claim 1 wherein the type of transaction is selected out of a request traffic and a response traffic.

5. The method according to claim 1 comprising changing the allocating of a VC associated with an FCU that is routed along a routing path when reaching a single turning point of the routing path.

6. The method according to claim 1 wherein each router of the routing path comprises samplers.

7. The method according to claim 1 wherein the routing comprises selecting between two or more physical channels that couple one router of the grid to another.

8. A method for traffic control in a network on chip (NOC), the method comprises:
   receiving, by input interface units of the NOC, flow control units destined to output interface units of the NOC; wherein multiple routing paths span between the input interface units and the output interface units; wherein at least some of the routing paths are formed by multiple routers of a grid of routers of the NOC and have a single turning point;
   allocating virtual channels to the flow control units, wherein an allocating of a virtual channel to a flow control unit (FCU) is based on a type of a transaction associated with the FCU and on a location of the single turning point; and
   routing the flow control units, based on the virtual channels allocated to the FCUs, between the input interface units and the output interface units;
   wherein for each of the at least some of the routing paths, the allocating and routing are executed by routers of the routing path, wherein the routers comprise at least one preceding router that precedes the single turning point of the routing path, a turning point router and at least one following router that follows the turning point router;
   wherein the method further comprises changing, by the turning point router, a preceding routing path allocated to a FCU to a following virtual channel.

* * * * *